US007273568B2

(12) United States Patent
Nagatomi et al.

(10) Patent No.: US 7,273,568 B2
(45) Date of Patent: *Sep. 25, 2007

(54) PHOSPHOR AND PRODUCTION METHOD OF THE SAME, METHOD OF SHIFTING EMISSION WAVELENGTH OF PHOSPHOR, AND LIGHT SOURCE AND LED

(75) Inventors: Akira Nagatomi, Tokyo (JP); Masahiro Gotoh, Tokyo (JP); Kenji Sakane, Tokyo (JP); Shuji Yamashita, Tokyo (JP)

(73) Assignee: Dowa Mining Co., Ltd., Tokyo (JP)

( * ) Notice: Subject to any disclaimer, the term of this patent is extended or adjusted under 35 U.S.C. 154(b) by 299 days.

This patent is subject to a terminal disclaimer.

(21) Appl. No.: 10/922,085

(22) Filed: Aug. 20, 2004

(65) Prior Publication Data

US 2006/0017365 A1    Jan. 26, 2006

(30) Foreign Application Priority Data

Jun. 25, 2004  (JP) .............................. 2004-188463

(51) Int. Cl.
  *C09K 11/59* (2006.01)
  *H01L 33/00* (2006.01)
(52) U.S. Cl. .................. 252/301.4 F; 252/301.6 F; 313/503; 257/98
(58) Field of Classification Search ......... 252/301.4 F, 252/301.4 R; 313/503; 257/98
See application file for complete search history.

(56) References Cited

U.S. PATENT DOCUMENTS 4,477,689 A   10/1984  Ogasahara et al.

(Continued)

FOREIGN PATENT DOCUMENTS

EP        0 459 156 A2     4/1991

(Continued)

OTHER PUBLICATIONS

JIS Z 8726; "Method of Specifying Colour Rendering Properties of Light Sources"; (1990), pp. 381-390.

(Continued)

*Primary Examiner*—C. Melissa Koslow
(74) *Attorney, Agent, or Firm*—Oliff & Berridge, PLC

(57) ABSTRACT

A phosphor including a main production phase of a phosphor expressed by a composition formula of MmAaBbOoNn:Zz (where an element M is one or more bivalent elements, an element A is one or more trivalent elements, an element B is one or more tetravalent elements, O is oxygen, N is nitrogen, an element Z is an activator, $n=2/3m+a+4/3b-2/3o$, $m/(a+b) \geq 1/2$, $(o+n)/(a+b) > 4/3$, wherein $m=a=b=1$ and o and n is not 0). A phosphor including 24 wt % to 30 wt % of Ca (calcium), 17 wt % to 21 wt % of Al (aluminum), 18 wt % to 22 wt % of Si (silicon), 1 wt % to 15 wt % of oxygen, 15 wt % to 33 wt % of nitrogen and 0.01 wt % to 10 wt % of Eu (europium), wherein an emission maximum in an emission spectrum is in a range of 600 nm to 660 nm; and wherein color chromaticity x of light emission is in a range of 0.5 to 0.7, and color chromaticity y of the light emission is in a range of 0.3 to 0.5.

32 Claims, 3 Drawing Sheets

U.S. PATENT DOCUMENTS

| | | | |
|---|---|---|---|
| 5,398,398 | A | 3/1995 | Williams et al. |
| 5,447,291 | A | 9/1995 | Sandhage |
| 6,670,748 | B2 | 12/2003 | Ellens et al. |
| 7,138,756 | B2 * | 11/2006 | Gotoh et al. ............. 313/467 |
| 2003/0030038 | A1 | 2/2003 | Mitomo et al. |
| 2003/0030368 | A1 | 2/2003 | Ellens et al. |
| 2003/0094893 | A1 * | 5/2003 | Ellens et al. ............. 313/503 |
| 2003/0132422 | A1 | 7/2003 | Tian et al. |
| 2003/0152804 | A1 | 8/2003 | Miura et al. |
| 2003/0213611 | A1 | 11/2003 | Morita |
| 2004/0155225 | A1 | 8/2004 | Yamada et al. |
| 2004/0263074 | A1 | 12/2004 | Baroky et al. |
| 2005/0189863 | A1 | 9/2005 | Nagatomi et al. |
| 2005/0203845 | A1 | 9/2005 | Yoshimine et al. |
| 2005/0205845 | A1 | 9/2005 | Deising et al. |
| 2005/0253500 | A1 | 11/2005 | Gotoh et al. |
| 2005/0267243 | A1 | 12/2005 | Amasaki et al. |
| 2006/0006782 | A1 | 1/2006 | Nagatomi et al. |
| 2006/0017365 | A1 | 1/2006 | Nagatomi et al. |
| 2006/0021788 | A1 | 2/2006 | Kohayashi et al. |
| 2006/0022573 | A1 | 2/2006 | Gotoh et al. |
| 2006/0033083 | A1 | 2/2006 | Sakane et al. |
| 2006/0043337 | A1 | 3/2006 | Sakane et al. |
| 2006/0045832 | A1 | 3/2006 | Nagatomi et al. |
| 2006/0065878 | A1 | 3/2006 | Sakane et al. |
| 2006/0076883 | A1 | 4/2006 | Himaki et al. |
| 2006/0091790 | A1 | 5/2006 | Nagatomi et al. |
| 2006/0170332 | A1 | 8/2006 | Tamaki et al. |
| 2006/0197432 | A1 | 9/2006 | Nagatomi et al. |
| 2006/0197439 | A1 | 9/2006 | Sakane et al. |
| 2006/0220047 | A1 | 10/2006 | Nagatomi et al. |
| 2006/0220520 | A1 | 10/2006 | Sakane et al. |
| 2006/0244356 | A1 | 11/2006 | Nagatomi et al. |
| 2007/0029525 | A1 | 2/2007 | Gotoh et al. |

FOREIGN PATENT DOCUMENTS

| | | | |
|---|---|---|---|
| EP | 1 296 376 | A2 | 3/2003 |
| EP | 1 445 295 | A1 | 8/2004 |
| JP | 05-015655 | | 1/1993 |
| JP | 05-198433 | | 8/1993 |
| JP | 11-144938 | | 5/1999 |
| JP | 11-277527 | | 10/1999 |
| JP | 2000-073053 | | 3/2000 |
| JP | 2000-153167 | | 6/2000 |
| JP | 2001-214162 | A | 8/2001 |
| JP | 2002-363554 | | 12/2002 |
| JP | 2003-013059 | | 1/2003 |
| JP | 2003-096446 | | 4/2003 |
| JP | 2003-124527 | A | 4/2003 |
| JP | 2003-515655 | A | 5/2003 |
| JP | 2003-277746 | A | 10/2003 |
| JP | 2003-336059 | A | 11/2003 |
| JP | 2004-055536 | A | 2/2004 |
| JP | 2004-055910 | | 2/2004 |
| JP | 2004-505470 | | 2/2004 |
| JP | 2004-067837 | | 3/2004 |
| JP | 2004-145718 | | 5/2004 |
| JP | 2004-189997 | | 7/2004 |
| JP | 2004-235598 | | 8/2004 |
| JP | 2004-244560 | | 9/2004 |
| JP | 2005-344025 | | 12/2005 |
| JP | 2006-028295 | | 2/2006 |
| JP | 2006-063214 | | 3/2006 |
| JP | 2006-063286 | | 3/2006 |
| JP | 2006-070109 | | 3/2006 |
| JP | 2006-176546 | | 7/2006 |
| WO | WO 01/40403 | A1 | 6/2001 |
| WO | WO 02/11214 | A1 | 2/2002 |
| WO | WO 2004/030109 | * | 4/2004 |
| WO | WO 2004/030109 | A1 | 4/2004 |
| WO | WO 2004/039915 | A1 | 5/2004 |
| WO | WO 2004/055910 | A1 | 7/2004 |
| WO | WO 2005/052087 | A1 | 6/2005 |

OTHER PUBLICATIONS

"Phosphor Handbook"; (compiled by Phosphor Research Society, published by Ohmusha, Ltd., 1987); pp. 172-176.
U.S. Appl. No. 10/984,772, filed Nov. 10, 2004 (Nagatomi et al.).
U.S. Appl. No. 11/061,669, filed Feb. 22, 2005 (Nagatomi et al.).
U.S. Appl. No. 11/063,847, filed Feb. 23, 2005 (Sakane et al.).
U.S. Appl. No. 11/149,317, filed Jun. 10, 2005 (Nagatomi et al.).
U.S. Appl. No. 11/149,192, filed Jun. 10, 2005 (Sakane et al.).
U.S. Appl. No. 11/198,281, filed Aug. 8, 2005 (Nagatomi et al.).
U.S. Appl. No. 11/194,590, filed Aug. 2, 2005 (Gotoh et al.).
U.S. Appl. No. 11/211,751, filed Aug. 26, 2005 (Sakane et al.).
U.S. Appl. No. 11/218,504, filed Sep. 6, 2005 (Nagatomi et al.).
U.S. Appl. No. 11/194,590, filed Aug. 2, 2005.
K. Uheda et al., "The Crystal Structure and Photoluminescence Properties of a New Red Phosphor, Calcium Aluminum Silicon Nitride Doped With Divalent Euroium," Abs. 2073, 206th Meeting., Oct. 3, 2004.

* cited by examiner

PHOSPHOR AND PRODUCTION METHOD OF THE SAME, METHOD OF SHIFTING EMISSION WAVELENGTH OF PHOSPHOR, AND LIGHT SOURCE AND LED

BACKGROUND OF THE INVENTION

1. Field of the Invention

The present invention relates to a phosphor used for a display device such as a CRT, a PDP, an FED and an EL, and a lighting apparatus and the like such as an LED, a vacuum fluorescent display and a fluorescent lamp, and a production method of the same, and a light source and an LED, and particularly relates to a phosphor excited by ultraviolet and blue light and the like, and emitting visible light or white light and the production method of the same, a method of shifting an emission wavelength of the phosphor, and a light source, an LED and the like using the phosphor.

2. Description of the Related Art

An electric discharge fluorescent lamp, an incandescent lamp and the like which are used as lighting devices at present have various problems such as inclusion of a harmful substance such as mercury and the short life span. However, the LEDs emitting blue light and ultraviolet light have been developed one after another in recent years, and the research and development have been increasingly conducted on the feasibility of combining ultraviolet to blue light generated from the LEDs with phosphors having excitation bands in the wavelength region of ultraviolet to blue color to thereby make a white light, and using the white light as the illumination of the next generation. This white light LED illumination generates less heat and is constructed by a semiconductor element and phosphors, and therefore it has the advantages of long life span without being burnt out as the conventional incandescent lamp and of disuse of a harmful substance such as mercury, and is an ideal lighting device.

Here, in order to obtain white light by combining the aforementioned LED with phosphor, two methods are generally considered. One is for obtaining white light emission by combining the LED emitting blue light with the phosphor, which is excited by receiving the blue light emission and emits yellow light, and combining the blue light emission with the yellow light emission.

The other one is a method for obtaining white light emission by RGB and other light by combining an LED emitting near-ultraviolet and ultraviolet light, and a phosphor emitting red (R) light, a phosphor emitting green (G) light, a phosphor emitting blue (B) light after the phosphor are excited by receiving the near ultraviolet and ultraviolet light emission, and the others. This method for obtaining white light emission by the RGB and other light makes it possible to obtain optional light emission color other than white light in accordance with the combination and mixture ratio of the RGB and other phosphors, and therefore has a wide application range as the lighting device. As the phosphors used for this purpose, for example, $Y_2O_2S:EU$, $La_2O_2S:Eu$, $3.5MgO.0.5MgF_2.GeO_2:Mn$, $(La, Mn, Sm)_2O_2S.Ga_2O_3:Eu$ are cited as red phosphors, for example, $ZnS:Cu,Al$, $SrAl_2O_4:Eu$, $BAM:Eu,Mn$ are cited as green phosphors, for example, $YAG:Ce$ is cited as a yellow phosphor, and for example, $BAM:Eu$, $Sr_5(PO_4)_3Cl:Eu$, $ZnS:Ag$, $(Sr, Ca, Ba, Mg)_{10}(PO_4)_6Cl:Eu$ are cited as blue phosphors. By combining these RGB and other phosphors with a light emitting portion such as an LED which emits near ultraviolet and ultraviolet light, it is possible to obtain a light source and a lighting device including an LED which emits white or a desired color.

As for white LED illumination by the combination of the blue LED and the yellow phosphor (YAG:Ce), light emission of long wavelength side in the visible light region is insufficient. Therefore, light emission of white slightly tinged with blue is provided, and light emission of while slightly tinged with red as an electric bulb cannot be obtained.

As for white LED illumination by the combination of the near ultraviolet and ultraviolet LED and RGB and other phosphors, the red. phosphor out of the phosphors of three colors is low in the excitation efficiency in the long wavelength side as compared with the other phosphors, and low in the emission efficiency. Therefore, the mixture ratio of only the red phosphor has to be increased, which causes the shortage of the phosphors for enhancing the luminance, and thus white color with high luminance cannot be obtained. Further, the emission spectrum of the phosphor is sharp, and therefore there exists the problem of unfavorable color rendering properties.

Therefore, there are recently reported an oxynitride glass phosphor having good excitation in the long wavelength side, and capable of providing the light emission peak with wide half band width (for example, see Patent Document 1), the phosphor using sialon as the host material (for example, see Patent Documents 2 and 3), and the phosphor containing nitrogen of silicon nitride series or the like (for example, see Patent Documents 4 and 5). The phosphor containing nitrogen has a large ratio of covalent bond as compared with oxide series phosphors. Therefore, the phosphor has the characteristic of having a good excitation band in the light of wavelength of 400 nm or more, and receives attention as the phosphor for white LED.

The inventors of the present invention have also reported the phosphor containing nitrogen, which has a favorable excitation band for the light of the ultraviolet to visible (250 to 550 nm) wavelength region emitted from the light emitting element emitting light in blue and ultraviolet. (See Patent Document 6.)

[Patent Document 1] Japanese Patent Application Laid-open No. 2001-214162

[Patent Document 2] Japanese Patent Application Laid-open No. 2003-336059

[Patent Document 3] Japanese Patent Application Laid-open No. 2003-124527

[Patent Document 4] Translated National Publication of Patent Application No. 2003-515655

[Patent Document 5] Japanese Patent Application Laid-open No. 2003-277746

[Patent Document 6] Japanese Patent Application No. 2004-055536

In order to enhance light emission properties of visible light or white light, in the light source including the LED emitting visible light and white light by combination of the light emitting element emitting blue and ultraviolet light with the phosphor having the excitation band for the wavelength region of ultraviolet to blue emitted from the light emitting element, enhancement of the emission efficiency of the light emitting element and phosphor is naturally required, and at the same time, light emission color (color chromaticity, emission wavelength, luminance) of the phosphor is also important. In addition, it is considered that the demand for the phosphor of light emission color and excitation band are each optimized in accordance with the use purpose of the LED, light source and the like will increase in the future. Here, the inventors have conceived the problems as will be explained hereinafter.

First, the problem about the luminance concerting the light emission color of the phosphor will be explained.

Even when the intensity of the light emission generated by the phosphor is physically the same, blue light of the short wavelength and red light of the long wavelength are felt dark in the visual sense of a human being as compared with yellow light and green light. This is because the wavelength which is felt the brightest in the human visual sensitivity is in yellowish green light in the vicinity of 555 nm. Accordingly, in the emission wavelength emitted by the phosphor, the light of the same color tone can be felt brighter by a man by increasing the ratio of this wavelength. As a result, when the phosphor with high ratio of the yellowish green light in the emission light wavelength is used, the luminance is enhanced, and therefore it is the problem to develop such a phosphor.

Next, the problem about the color rendering properties concerning light emission color of a phosphor will be explained.

Considering the light emission color of a phosphor also from the viewpoint as illumination, the light emission color is demanded to be a broad emission spectrum without a gap from blue to red when combined with the light emitting portion of ultraviolet to blue. For example, a YAG:Ce yellow phosphor, which is a general phosphor, has the emission wavelength in the vicinity of about 560 nm, and can be said to be the phosphor having the emission spectrum of the best emission efficiency for the visual sensitivity. However, when white light is to be obtained by combining the YAG:Ce yellow phosphor with the blue LED, sufficient luminance is obtained in the viewpoint of the aforementioned luminance (visual sensitivity), but the light emission color in the long wavelength side, corresponding to red becomes insufficient. Therefore, the obtained emission light becomes white emission light slightly tinged with blue, and white emission light slightly tinged with red as the emission light of the incandescent lamp cannot be obtained. Therefore, when white light generated by combining the YAG:Ce yellow phosphor with the blue LED is emitted to a red object, the phenomenon in which red looks dark occurs, and which becomes a problem in the color rendering properties. As a method for solving the problem of the color rendering properties, it is required to realize the light emission of the spectrum from blue to red without a gap by further adding red light to yellow light emitted by the YAG:Ce yellow phosphor, and in order to obtain the red light, it is the problem to develop a phosphor of red color having the color rendering properties and luminance properties.

Further, the problem concerning the excitation range of the excitation light of the phosphor will be explained.

Seeing the aforesaid YAG:Ce yellow phosphor from the viewpoint of enhancement of the emission efficiency of the light emitting element for exciting a phosphor and the phosphor, the YAG:Ce yellow phosphor is in the excitation range with favorable efficiency when it is made to emit light with blue light emitted by the blue LED. However, when it is made to emit light with near ultraviolet and ultraviolet light emitted by the near ultraviolet and ultraviolet LED, the YAG:Ce yellow phosphor is out of the excitation range with favorable efficiency, and therefore sufficient light emission is not obtained. The cause of this is that the excitation range with favorable efficiency for the YAG:Ce yellow phosphor is narrow.

When the YAG:Ce yellow phosphor is made to emit light with blue light emitted by the aforementioned blue LED, the problem that the excitation range with favorable efficiency for the YAG:Ce yellow phosphor is narrow leads to the situation in which the wavelength balance of the blue and yellow is lost as a result that the emission light wavelength of the blue LED is out of the optimal excitation range of the YAG:Ce yellow phosphor due to the variation of the emission light wavelength caused by the variation in the light emitting element at the time of production of the blue LED. If such a situation is brought about, there arises the problem that the color tone of the white light, which is obtained by synthesizing blue light and yellow light, changes. Here, the variation in the emission wavelength following the production of the LED cannot be avoided, and therefore, in order to avoid the change in the color tone, it is the problem to develop the phosphor having the properties that the range of the excitation band is wide and flat.

The present invention is made in view of the aforementioned problems, and has its object to provide a phosphor, of which emission wavelength can be optionally set the region with high visual sensitivity of a human being, thereby making it possible to enhance the luminance in the region, emitting light of red color having color rendering properties and luminance properties, and has the excitation band for the light in the wide wavelength region of the ultraviolet to visible light (250 nm to 600 nm) emitted from the light emitting portion, when the phosphor is used in combination with the ultraviolet to visible light emitting portion, and a production method of the same, a method for shifting the emission wavelength of the phosphor, and a light source and a LED using the phosphor.

SUMMARY OF THE INVENTION

As a result of pursuing the study on the compositions of various phosphors for the aforementioned problems, the inventors has been able to obtain the phosphor of which emission wavelength can be optionally set in a region with high visual sensitivity, excellent in luminance properties and high in emission efficiency.

Namely, a first constitution to solve the aforesaid problems is a phosphor characterized by including a main production phase of a phosphor expressed by a composition formula of $M_mA_aB_bO_oN_n:Z_z$ (where an element M is one or more bivalent elements, an element A is one or more trivalent elements, an element B is one or more tetravalent elements, O is oxygen, N is nitrogen, an element Z is an activator, $n=2/3m+a+4/3b-2/3o$, $m/(a+b) \geq 1/2$, $(o+n)/(a+b) > 4/3$, and each of m, a, b, o and n is not 0).

A second constitution is the phosphor according to the first constitution, characterized in that $m=a=b=1$.

A third constitution is the phosphor according to the first or second constitution, characterized in that $0 < o \leq m$ and $0.0001 \leq z/(m+z) \leq 0.5$.

A fourth constitution is the phosphor according to any one of the first to third constitutions, characterized in that the element M is one or more elements selected from Mg (magnesium), Ca (calcium), Sr (strontium), Ba (barium) and Zn (zinc), the element A is one or more elements selected from B (boron), Al (aluminum) and Ga (gallium), the element B is Si (silicon) and/or Ge (germanium), and the element Z is one or more elements selected from rare earth or transition metals.

A fifth constitution is the phosphor according to any one of the first to fourth constitutions, characterized in that the element A is Al (aluminum), and the element B is Si (silicon).

A sixth constitution is the phosphor according to any one of the first to fifth constitutions, characterized in that the element Z is at least one or more elements selected from Eu (europium), Mn (manganese), Sm (samarium) and Ce (cerium).

A seventh constitution is the phosphor according to any one of the first to sixth constitutions, characterized in that the element Z is Eu (europium).

An eighth constitution is a phosphor comprising the main production phase of the phosphor expressed by the composition formula of MmAaBbOoNn:Zz according to any one of the first to seventh constitutions and oxygen, the aforesaid phosphor including the aforesaid oxygen by 3 wt % or less with respect to a mass of the main production phase of the phosphor.

A ninth constitution is a phosphor comprising 24 wt % to 30 wt % of Ca (calcium), 17 wt % to 21 wt % of Al (aluminum), 18 wt % to 22 wt % of Si (silicon), 1 wt % to 15 wt % of oxygen, 15 wt % to 33 wt % of nitrogen and 0.01 wt % to 10 wt % of Eu (europium), characterized in that an emission maximum in an emission spectrum is in a range of 600 nm to 660 nm; and in that color chromaticity "x" of light emission is in a range of 0.5 to 0.7, and color chromaticity "y" of light emission is in a range of 0.3 to 0.5.

A tenth constitution is the phosphor according to any one of the first to ninth constitutions, characterized in that the aforesaid phosphor is in a powder form.

An eleventh constitution is the phosphor according to the tenth constitution, characterized in that an average particle size of the phosphor in the powder form is from 0.1 μm to 20 μm inclusive.

A twelfth constitution is a manufacturing method of the phosphor according to any one of the first to eleventh constitutions, characterized by including:

as a raw material of at least one element selected from the element M, element A and element B, preparing a compound having the element and oxygen, and a compound having the element and nitrogen; and controlling an oxygen concentration included in the main production phase of the aforesaid phosphor by compounding of the compound having the element and oxygen and the compound having the element and nitrogen.

A thirteenth constitution is a method of shifting an emission wavelength of the phosphor according to any one of the first to eleventh constitutions, characterized by including:

as a raw material of at least one element selected from the element M, element A and element B, preparing a compound having the element and oxygen, and a compound having the element and nitrogen; and controlling an oxygen concentration included in the main production phase of the aforesaid phosphor by compounding of the compound having the element and oxygen and the compound having the element and nitrogen, and thereby shifting the emission wavelength.

A fourteenth constitution is a method of shifting the emission wavelength of the phosphor according to any one of the first to eleventh constitutions, characterized by including:

controlling a compounding amount of the element Z, and thereby shifting the emission wavelength.

A fifteenth constitution is a method of shifting an emission wavelength of the phosphor according to any one of the first to eleventh constitutions, characterized by including:

as a raw material of at least one element selected from the element M, element A and element B, preparing a compound having the element and oxygen, and a compound having the element and nitrogen;

controlling an oxygen concentration included in the main production phase of the phosphor by compounding of the compound having the element and oxygen and the compound having the element and nitrogen; and controlling a compounding amount of the element Z, and thereby sifting the emission wavelength.

A sixteenth constitution is a light source characterized by including the phosphor according to any one of the first to eleventh constitutions, and a light emitting portion emitting light of a predetermined wavelength, and in that a part of the light of the predetermined wavelength is set to be an excitation source, and the aforesaid phosphor is made to emit light of a different wavelength from the predetermined wavelength.

A seventeenth constitution is the light source according to the sixteenth constitution, characterized in that the predetermined wavelength is a wavelength of any one of 250 nm to 600 nm.

An eighteenth constitution is an LED characterized by including the phosphor according to any one of the first to eleventh constitutions, and a light emitting portion emitting light of a predetermined wavelength, and in that a part of the light of the predetermined wavelength is set to be an excitation source, and the aforesaid phosphor is made to emit light of a different wavelength from the predetermined wavelength.

A nineteenth constitution is the LED according to the eighth constitution, characterized in that the predetermined wavelength is a wavelength of any one of 250 nm to 600 nm.

DETAILED DESCRIPTION OF THE PREFERRED EMBODIMENT(S)

Figure 1:
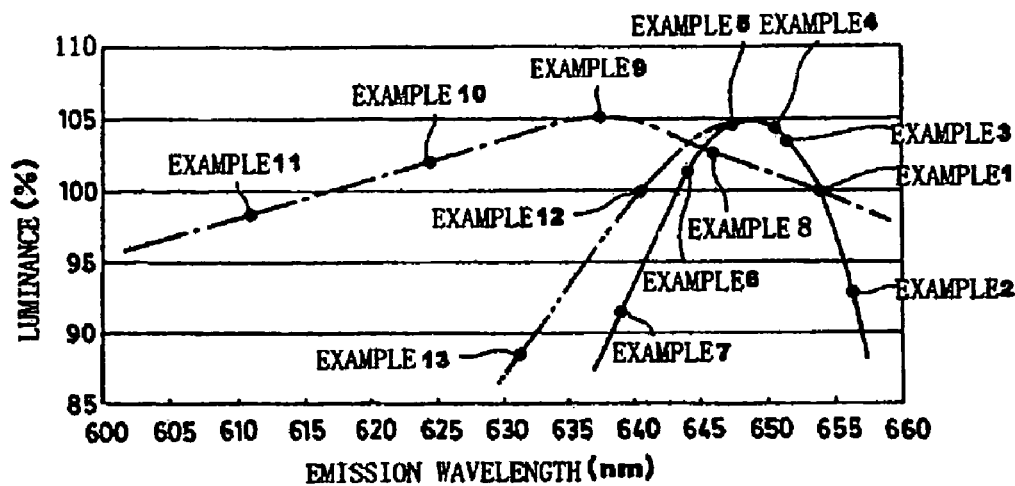
FIG. 1 is a graph showing the relationship between the emission maximum of the emission wavelength and luminance of a main production phase of the phosphor according to the present invention.

A phosphor according to the present invention is a phosphor including a main production phase (hereinafter, described as a production phase) of a phosphor expressed by the composition formula of MmAaBbOoNn:Z. Here, element M is at least one or more bivalent elements in the main production phase of the aforesaid phosphor. Element A is at least one or more trivalent elements in the aforesaid production phase. Element B is at least one or more tetravalent elements in the aforesaid production phase. O represents oxygen and N represents nitrogen. Element Z is an element which acts as an activator in the aforesaid production phase, and is at least one or more elements selected from rare-earth elements or transition-metal elements. If a production phase has this constitution, the production phase can obtain the phosphor, which has an excitation band for the light in the range of ultraviolet to visible light (wavelength region of 250 nm to 600 nm) with high luminance and wide half band width of the emission spectrum, and emits fluorescence of red color having color rendering properties and luminance properties.

When the aforementioned production phase has a chemically stable constitution, an impurity phase which does not contribute to light emission is difficult to generate in the constitution, and therefore reduction in the light emission properties can be suppressed, which is a preferable constitution. Therefore, in order to allow the production phase to take a chemically stable constitution, it is preferable that the production phase has the constitution which is expressed by the aforementioned composition formula of $M_mA_aB_bO_oN_n:Z$, and $n=2/3m+a+4/3b-2/3o$, $m/(a+b) \geq 1/2$, and $(o+n)/(a+b) > 4/3$. It should be noted that any of m, a, b, o and n is not 0.

Further, in the production phase having the constitution of the aforementioned composition formula of $M_mA_aB_bO_oN_n:Z$, the element M is the element with positive bivalency, the element A is the element with positive trivalency, and the element B is the element with positive tetravalency, and oxygen is the element with negative bivalency, and nitrogen is the element with negative trivalency. Therefore, $m=a=b=1$ is satisfied, and thereby the constitution of the production phase becomes a more stable compound, which is preferable. In this case, the preferable range of the content of nitrogen in the compound is determined by the content of oxygen in the constitution, and in the case of $m=a=b=1$, it is expressed by $n=3-2/3o$ (where $0<o\leq 1$). However, in any case, a small composition deviation from the composition formula expressing the constitution of the production phase is permitted.

Meanwhile, by controlling a mole ratio "o" of oxygen in the production phase having the constitution of the aforementioned composition formula of $M_mA_aB_bO_oN_n:Z$, the emission maximum of the emission wavelength of the phosphor can be optionally shifted, and set in the range of 600 nm to 660 nm. It is noted that the mole ratio o of oxygen is preferably controlled in the range of $0<o\leq m$. This is because when the content of oxygen is in this range, and reduction in the luminance of the production phase can be avoided without generating an impurity composition.

Further, by the control of the doping amount of the activator element Z, the emission maximum of the emission spectrum of the production phase can be also shifted, and set, which is useful on adjustment of the luminance.

As for the control of the doping amount of the activator element Z, it is preferable that the mole ratio $z/(m+z)$ of the element M and the activator element Z is preferably in the range from 0.0001 to 0.5 inclusive. When the mole ratio $z/(m+z)$ of the element M and the activator element Z is in this range, reduction in the emission efficiency due to concentration quenching caused by the excessive content of the activator can be avoided, while reduction in the emission efficiency due to shortage of the light emission contributing element caused by too small content of the activator can be avoided. In addition, when the value of $z/(m+z)$ is in the range from 0.0005 to 0.1 inclusive, good light emission can be obtained, which is preferable. However, the optimal value of the range of the value of $z/(m+z)$ varies slightly in accordance with the kind of the activator element Z and the kind of element M.

The phosphor according to the present invention sometimes contain the aforementioned production phase and oxygen. The oxygen is considered to be the oxygen adhering to the surface of the raw material from the beginning, the oxygen mixed in as a result of oxidation of the surface of the raw material at the time of preparation of firing and at the time of firing, and the oxygen adsorbed onto the surface of the phosphor specimen after firing. Judging from the analysis result of the phosphor according to the examples which will be described later, it is considered that oxygen of 3 wt % or less is contained with respect to the mass of the production phase. Since the phosphor according to the present invention further contains oxygen apart from the production phase, more oxidation than this hardly occurs, and therefore it can be considered to be a phosphor excellent in durability and having long life span.

On producing the phosphor specimen according to the present invention, as raw materials of the element M (+bivalency), the element A (+trivalency) and the element B (+tetravalency), any compounds of a nitride of each of them, and an oxide of each of them may be used. For example, a nitride ($M_3N_2$) of the element M and the oxide (MO) of the element M, and the nitrides of the element A and the element B (AN, $B_3N_4$) may be used and mixed. By controlling the compounding radio of both the nitrides and the oxides, the oxygen amount and the nitrogen amount in the specimen can be controlled without changing the value of m. The nitrides and the oxide do not mean to be limited to the compound chemically combined with only oxygen, and the compound chemically combined with only nitrogen, but the oxide means the compound having oxygen and the element which substantially becomes an oxide, for example, such as carbonate, oxalate or the like, as a result of decomposition during firing, and in the case of the nitride, the nitride means the compound having the element and nitrogen. However, in the following explanation, the explanation is made by using the example of the oxide of the element as the compound having the element and oxygen, and the example of the nitride of the element as the compound having the element and nitrogen, for convenience.

For example, when weighing is performed under the conditions of $m=a=b=1$ and the mole ratio of oxygen of $o=0.5$, each raw material is weighed at the mole ratio of $M_3N_2:MO:AN:B_3N_4=0.5:1.5:3:1$. Further, in this case, when the element Z of the activator is, for example, a bivalent element, a part of the element M is replaced by the element Z, and therefore it is preferable to set $(m+z)=a=b=1$ in consideration of this replacement. Thereby, the constitution of the production phase can take a chemically stable constitution, and the phosphor with high efficiency and high luminance can be obtained.

It is preferable that the aforesaid element M is at least one or more element or elements selected from Be, Mg, Ca, Si, Ba, Zn, Cd and Hg, and it is more preferable that the element M is at least one or more element or elements selected from Mg, Ca, Sr, Ba and Zn.

It is preferable that the aforesaid element A is at least one or more element or elements selected from the elements taking trivalency such as B (boron), Al, Ga, In, Tl, Y, Sc, P, As, Sb and Bi, it is more preferable that the element A is at least one or more element or elements selected from B, Al and Ga, and it is the most preferable that it is Al. AlN which is the nitride of Al is used as a general heat conducting material and structural material, and Al is preferable because it is easily available at low cost and has small environmental load in addition.

It is preferable that the aforesaid element B is at least one or more element or elements selected from the elements taking tetravalency such as C, Si, Ge, Sn, Ti, Hf, Mo, W, Cr, Pb and Zr, it is more preferable that the element B is Si and/or Ge, and it is the most preferable that it is Si. $Si_3N_4$ which is the nitride of Si is used as a general beat conducting material and a structural material, and Si is preferable because it is easily available at low cost and has small environmental load in addition.

It is preferable that the aforesaid element Z is at least one or more element or elements selected from rare-earth elements or transition-metal elements, and in order to allow, for example, the white light source and the white LED using this phosphor to exhibit color rendering properties, it is preferable that the light emission of the production phase is a spectrum with wide half band width. From this point of view, the element Z is preferably at least one or more element or elements selected from Eu, Mn, Sm and Ce. Since with use of Eu among others, the production phase shows strong light emission from orange-colored to red, high emission efficiency and high color rendering properties are obtained, and Eu is more preferable as the activator for the production phase applied to the white illumination and white LED.

In accordance with the kind of the element Z replacing a part of the element M of the constitution of the production phase, the phosphor having the light emission of different wavelengths can be obtained.

As a result that the aforesaid element M, element A, element B and element Z take the above-described constitutions, the luminescence intensity and luminance of the production phase are enhanced. Further, when Ca is selected as the preferable element M, Al is selected as the preferable element A, Si is selected as the preferable element B, and Eu is selected as the preferable element Z, and when 24 to 30 wt % of Ca, 17 to 21 wt % of Al, 18 to 22 wt % of Si, 1 to 15 wt % of oxygen, 15 to 33 wt % of nitrogen, and 0.01 to 10 wt % of Eu are included as the respective element concentration of the phosphor according. to the present invention, the phosphor is preferable because it has the excitation band from ultraviolet to visible light (wavelength. region of 250 nm to 600 nm), with the emission maximum in the emission spectrum in the range of 600 nm to 660 nm, the color chromaticity "x" of light emission in the range of 0.5 to 0.7, and the color chromaticity "y" of the light emission in the range of 0.3 to 0.5.

When the phosphor according to the present invention is used in the form of powder, it is preferable that the average particle size of the phosphor powder is 20 µm or less. This is because light emission is considered to occur mainly on the particle surfaces in the phosphor powder, and if the average particle size is 20 µm or less, the surface area per powder unit weight can be ensured and reduction in luminance can be avoided. Further, when the powder is formed into a paste, and is coated on the light emitting element or the like, the density of the powder can be also enhanced, and reduction in luminance can be also avoided from this point of view. According to the study of the inventors, it is found out that the average particle size is preferably larger than 0.1 µm from the viewpoint of the emission efficiency of the phosphor powder, though the detailed reason is not known. From the above, it is preferable that the average particle size of the phosphor powder according to the present invention is from 0.1 µm to 20 µm inclusive.

As explained thus far, the phosphor according to the present invention has a favorable excitation band in the wide range of ultraviolet to visible light (wavelength region of 250 to 600 nm), the emission maximum of the emission wavelength of the phosphor is capable of being shifted optionally and set in the range of 600 nm to 660 nm, and light emission of the phosphor is the light emission of red color having color rendering properties and luminance properties, which is the spectrum with wide half band width. Therefore, by combining the phosphor with the light emitting portion emitting ultraviolet to blue light, a light source and an LED of monochromatic or white light with high luminance and good color rendering properties, and a lighting unit including them can be further obtained.

Next, an example of production method of the phosphor according to the present invention will be explained with the production of $Ca_{0.985}AlSiO_{0.523}N_{2.652}:Eu_{0.0150}$ cited as an example.

First, the oxide raw material and nitride raw material of the element M, the nitride raw material of the element A, and the nitride raw material of the element B are prepared. The oxide raw material of the element A and/or the element B may be used if desired.

Each of the oxide raw material and nitride raw material may be a commercially available raw material, but the raw material with higher purity is preferable, and therefore the raw material of 2N or more is preferably prepared, and the raw material of 3N or more is more preferably prepared. Though it is generally preferable that the particle size of each raw material particle is very fine from the viewpoint of promotion of the reaction, but the particle size and the shape of the phosphor to be obtained change in accordance with the particle sizes and shapes of the raw materials. Therefore, the nitride raw materials and the oxide raw material are prepared, which have approximate particle sizes corresponding to the particle size required of the phosphor to be finally obtained.

The raw material of the element Z may be a commercially available oxide raw material, but the raw material with higher purity is preferable, and therefore the raw material of 2N or more is preferably prepared, and the raw material of 3N or more is more preferably prepared. The oxygen contained in the oxide raw material of the element Z is also supplied into the composition of the production phase, and therefore it is preferable to take this oxygen supply amount into consideration when considering the mix proportions of the aforementioned element M raw material, element A raw material and element B raw material.

In production of $Ca_{0.985}AlSiO_{0.523}N_{2.652}:Eu_{0.0150}$, for example, as two kinds of nitride and oxide of the element M, the nitrides of the element A and element B, it is suitable to prepare $Ca_3N_2$(2N), CaO(2N), AlN(3N) and $Si_3N_4$(3N), respectively. As the element Z, $Eu_2O_3$(3N) is prepared.

These raw materials are weighed with the mixture ratio of the respective raw materials being set at (0.985−0.50)/3 mol of $Ca_3N_2$, 0.50 mol of CaO, 1 mol of AlN, 1/3 mol of $Si_3N_4$, and 0.015/2 mol of $Eu_2O_3$ so that the mole ratio of each element is m:a:b:z=0.985:1:1:0.015.

As for the weighing and blending, the operation inside the glove box under an inert gas atmosphere is convenient. The nitride of each of the raw material elements is susceptible to moisture, and therefore it is suitable to use the inert gas from which moisture is sufficiently removed. When the nitride raw material is used as each raw material element, dry blending is preferable for the blending method to avoid decomposition of the raw material, and an ordinary dry blending method using a ball mill, a mortar or the like may be adopted.

The raw materials after completion of blending are put into a crucible, and are held in the inert atmosphere such as nitrogen for three hours at 1000° C. or more, preferably at 1400° or more, and more preferably at 1500° C. or more to be fired. The holding time can be shortened since the firing advances more quickly as the firing temperature is higher. Meanwhile, in the case of the low firing temperature, the intended light emission properties can be obtained by keeping the temperature for a long time. However, since the particle growth advances as the firing time is longer and the particle size becomes larger, the firing time is set in accordance with the intended particle size. As the crucible, use of the crucible made of BN (boron nitride) is preferable since inclusion of impurities from the crucible can be avoided. After firing is completed, the fired matter is taken out of the crucible, and grinded by using grinding means such as a mortar and a ball mill so that a predetermined average particle size is obtained, and thereby the phosphor including the production phase expressed by the composition formula of $Ca_{0.9856}AlSiO_{0.523}N_{2.652}:EU_{0.0150}$ can be produced.

When the other elements are used as the element M, element A, element B and element Z, and when the set value of $z/(m+z)$ is changed, the phosphor including the production phase having a predetermined composition formula can be produced by the same production method as the one described above by adapting the compounding amount of each of the material at the time of preparation to a predetermined composition ratio.

Here, an application method of the phosphor according to the present invention to an LED and a light source will be explained.

By combining the phosphor according to the present invention in the powder form with a light emitting portion (particularly, the light emitting portion emitting any light in the wavelength region of 250 nm to 600 nm) according to a known method, various kinds of display devices and lighting units can be produced. For example, in combination with a discharge lamp which emits ultraviolet light, a fluorescent lamp, a lighting unit and a display device can be produced, and in combination with an LED light emitting element which emits ultraviolet to blue light, an illumination unit and a display device can be also produced.

Further, by the aforementioned control of the mole ratio o of the oxygen of the production phase in the range of $0<o\leq m$, and the control of the doping amount of the activator element Z, the emission wavelength of the phosphor is shifted, and coordinated with the wavelength of the light emitted by the light emitting portion, whereby white light having an optional color chromaticity point with better balanced luminance and color rendering properties can be obtained.

EXAMPLES

Hereinafter, based on the examples, the present invention will be explained more specifically.

Example 1

Commercially available $Ca_3N_2(2N)$, $AlN(3N)$, $Si_3N_4$ (3N), $Eu_2O_3(3N)$ were prepared, and after each raw material was weighed so that 0.985/3 mol of $Ca_3N_2$, 1 mol of AlN, 1/3 mol of $Si_3N_4$, and 0.015/2 mol of $Eu_2O_3$ are obtained, the raw materials were blended by using the mortar inside the globe box under the nitrogen atmosphere. After the blended raw materials were put into the crucible and were held under the nitrogen atmosphere at 1500° C. for three hours and fired, the raw materials were cooled from 1500° C. to 200° C. in one hour, and the phosphor including the production phase expressed by the composition of $CaAlSiN_3:Eu$ was obtained. The particle size of the obtained phosphor specimen was 3 to 4 μm. (Hereinafter, in the examples 2 to 13, the particle sizes of the obtained phosphor specimens were 3 to 4 μm.)

The excitation light source of the wavelength of 460 nm was emitted to the obtained phosphor and the light emission properties were measured. In the items of the measured light emission properties, the emission maximum expresses the wavelength at the peak which shows the wavelength with the highest luminescence intensity in the emission spectrum in (nm). The luminescence intensity expresses the luminescence intensity in the emission maximum by the relative intensity, and the intensity of the example 1 is standardized as 100%. The luminance is the value of Y obtained based on the calculation method in the XYZ colorimetric system defined in the JISZ8701. The color chromaticity expresses the color chromaticities x and y obtained by the calculation method defined in the JISZ8701. The oxygen and nitrogen concentration (O/N) contained in the phosphor powder specimen were measured by using the oxygen and nitrogen simultaneous analyzer (TC-436) made by LECO Co., Ltd., and the concentrations of the other elements are the measured values by using the ICP.

The raw material composition formula of the phosphor specimen, the concentration analysis result of each element, the measurement result of the light emission properties are shown in Table 1.

From the measurement; result of the oxygen and nitrogen concentration, the analysis values of the oxygen concentration and the nitrogen concentration in the phosphor specimen were 2.4 wt % and 28.5 wt %. Meanwhile, since the nitrogen concentration in the production phase in the phosphor specimen is 2.98 mol and the oxygen concentration is 0.21 mol, the calculated oxygen concentration is 0.3 wt % and the calculated nitrogen concentration is 30 wt %.

Comparing both of them, concerning the oxygen concentration, a considerably large amount of oxygen is contained in the specimen with respect to the oxygen concentration of 0.3 wt % in the production phase. The excessive oxygen of about 2 wt % is considered to be he oxygen originally adhering to the surface of the raw materials, the oxygen included as a result of oxidation of the surface of the raw materials at the time of preparation of the firing and at the time of the firing, and the oxygen adsorbed onto the surface of the phosphor specimen after the firing, and is considered to be the oxygen existing separately from the constitution of the production phase.

Meanwhile, concerning the nitrogen concentration, the approximately same amount of nitrogen (30 wt %) with respect to the nitrogen concentration of 28.5% in the production phase is contained in the specimen. From this result, it is considered that the nitrogen existing separately from the constitution of the production phase hardly exists.

Figure 2:
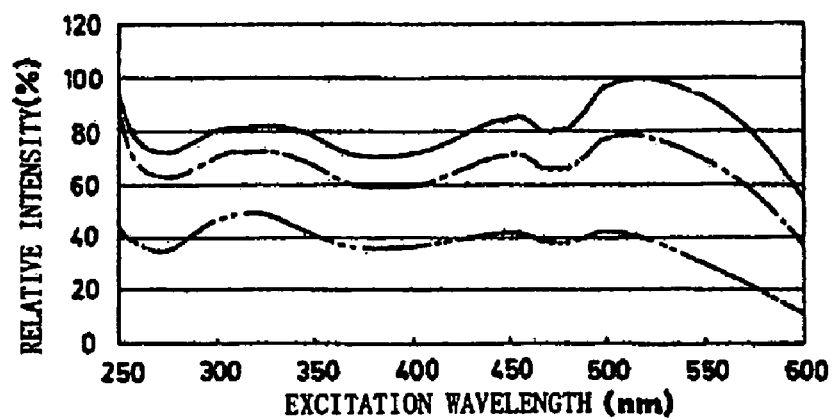
FIG. 2 is a graph showing an excitation spectrum of the main production phase of the phosphor according to the present invention.
Figure 3:
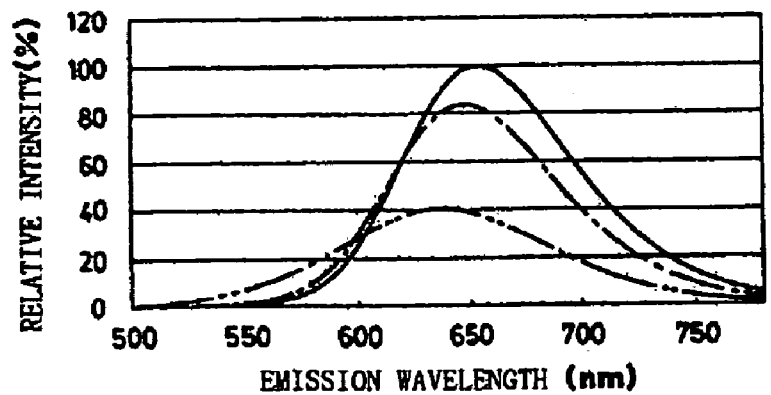
FIG. 3 is a graph showing an emission spectrum of the main production phase of the phosphor according to the present invention.

Further, the excitation spectrum showing the excitation band of the obtained phosphor specimen, and the emission spectrum showing the light emission properties were measured, and the result of them are show n FIG. 2 and FIG. 3.

FIG. 2 is a graph in which the relative intensity is plotted in the vertical axis, the excitation wavelength (nm) is plotted in the horizontal axis, and the excitation spectrum of the phosphor specimen is plotted by the solid line.

As is obvious from the measurement result in FIG. 2, it has been found out that the excitation spectrum of the phosphor specimen according to the example 1 exists in the wide range of 250 nm to 600 nm, and the light in the wide range from the ultraviolet to visible light can be utilized sufficiently and effectively.

FIG. 3 is a graph in which the relative intensity is plotted in the vertical axis, the emission wavelength (nm) is plotted in the horizontal axis, and the emission spectrum of the phosphor specimen is plotted by the solid line.

As is obvious from the measurement result in FIG. 3, it has been found out that the emission spectrum of the phosphor specimen according to the example 1 has the peak value at 654 nm, and has the half band width over the area with high visual sensitivity.

Example 2

Except that the mixture ratio of the respective raw materials was set at 0.9825/3 mol of $Ca_3N_2$, mol of AlN, 1/3 mol of $Si_3N_4$ and 0.0175/2 mol of $EU_2O_3$, the phosphor specimen according to the example 2 was produced similarly to the example 1, and the light emission properties were measured. The raw material composition formula, the concentration analysis result of each element, and the measurement result of the light emission properties of the phosphor specimen are shown in Table 1.

Example 3

Except that the mixture ratio of the respective raw materials was set at 0.9875/3 mol of $Ca_3N_2$, 1 mol of AlN, 1/3 mol of $Si_3N_4$ and 0.0125/2 mol of $Eu_2O_3$, the phosphor specimen according to the example 3 was produced similarly to the example 1, and the light emission properties were measured. The raw material composition formula, the concentration analysis result of each element, and the measurement result of the light emission properties of the phosphor specimen are shown in Table 1.

Example 4

Except that the mixture ratio of the respective raw materials was set at 0.99/3 mol of $Ca_3N_2$, 1 mol of AlN, 1/3 mol of $Si_3N_4$ and 0.01/2 mol of $EU_2O_3$, the phosphor specimen according to the example 4 was produced similarly to the example 1, and the light emission properties were measured. The raw material composition formula, the concentration analysis result of each element, and the measurement result of the light emission properties of the phosphor specimen are shown in Table 1.

Example 5

Except that the mixture ratio of the respective raw materials was set at 0.9925/3 mol of $Ca_3N_2$, 1 mol of AlN, 1/3 mol of $Si_3N_4$ and 0.0075/2 mol of $Eu_2O_3$, the phosphor specimen according to the example 5 was produced similarly to the example 1, and the light emission properties were measured. The raw material composition formula, the concentration analysis result of each element, and the measurement result of the light emission properties of the phosphor specimen are shown in Table 1.

Further, the excitation spectrum and the emission spectrum of the obtained phosphor specimen were measured, and the results were shown by being plotted by the dashed lines in FIG. 2 and FIG. 3.

As is obvious from the measurement result in FIG. 2, it has been found out that the excitation spectrum of the phosphor specimen according to the example 5 exists in the wide range of 250 nm to 600 nm, and the light in the wide range from the ultraviolet to visible light can be utilized sufficiently and effectively.

As is obvious from the measurement result in FIG. 3, it has been found out that the emission spectrum of the phosphor specimen according to the example 5 has the peak value, which is lower than the example 1, at 647.5 nm, but it has the half band width over the range with higher visual sensitivity than the example 1.

Example 6

Except that the mixture ratio of the respective raw materials was set at 0.9950/3 mol of $Ca_3N_2$, 1 mol of AlN, 1/3 mol of $Si_3N_4$ and 0.0050/2 mol of $EU_2O_3$, the phosphor specimen according to the example 6 was produced similarly to the example 1, and the light emission properties were measured. The raw material composition formula, the concentration analysis result of each element, and the measurement result of the light emission properties of the phosphor specimen are shown in Table 1.

Example 7

Except that the mixture ratio of the respective raw materials was set at 0.9975/3 mol of $Ca_3N_2$, 1 mol of AlN, 1/3 mol of $Si_3N_4$ and 0.0025/2 mol of $Eu_2O_3$, the phosphor specimen according to the example 7 was produced similarly to the example 1, and the light emission properties were measured. The raw material composition formula, the concentration analysis result of each element, and the measurement result of the light emission properties of the phosphor specimen are shown in Table 1.

TABLE 1

| | RAW MATERIAL PREPARATION COMPOSITION FORMULA | EACH ELEMENT CONCENTRATION MEASUREMENT RESULT | | | | | | PEAK WAVE- LENGTH (nm) | LIGHT EMIS- SION INTEN- SITY (%) | COLOR CHROMATI- CITY | | LUMI- NANCE (%) |
|---|---|---|---|---|---|---|---|---|---|---|---|---|
| | | Ca (wt %) | Al (wt %) | Si (wt %) | O (wt %) | N (wt %) | Eu (wt %) | | | x | y | |
| EXAMPLE 2 | $Ca_{0.983}AlSiO_{0.026}N_{2.983}:Eu_{0.0175}$ | 28.1 | 19.2 | 19.5 | 2.4 | 28.5 | 2.1 | 656.4 | 100.4 | 0.679 | 0.321 | 92.9 |
| EXAMPLE 1 | $Ca_{0.985}AlSiO_{0.023}N_{2.985}:Eu_{0.0150}$ | 27.5 | 19.8 | 20.0 | 2.3 | 28.6 | 1.7 | 654.0 | 100.0 | 0.675 | 0.324 | 100.0 |
| EXAMPLE 3 | $Ca_{0.988}AlSiO_{0.018}N_{2.968}:Eu_{0.0125}$ | 27.0 | 18.8 | 18.8 | 2.2 | 31.2 | 1.4 | 651.6 | 96.0 | 0.671 | 0.328 | 103.5 |

TABLE 1-continued

| | RAW MATERIAL PREPARATION COMPOSITION FORMULA | EACH ELEMENT CONCENTRATION MEASUREMENT RESULT | | | | | | PEAK WAVE-LENGTH (nm) | LIGHT EMISSION INTENSITY (%) | COLOR CHROMATICITY | | LUMINANCE (%) |
|---|---|---|---|---|---|---|---|---|---|---|---|---|
| | | Ca (wt %) | Al (wt %) | Si (wt %) | O (wt %) | N (wt %) | Eu (wt %) | | | x | y | |
| EXAMPLE 4 | $Ca_{0.990}AlSiO_{0.015}N_{2.993}:Eu_{0.0100}$ | 27.5 | 19.6 | 19.8 | 2.6 | 28.2 | 1.1 | 650.7 | 88.8 | 0.666 | 0.333 | 104.3 |
| EXAMPLE 5 | $Ca_{0.993}AlSiO_{0.011}N_{2.993}:Eu_{0.0075}$ | 27.5 | 18.7 | 18.8 | 2.0 | 32.2 | 0.9 | 647.5 | 82.4 | 0.661 | 0.338 | 104.6 |
| EXAMPLE 6 | $Ca_{0.995}AlSiO_{0.008}N_{2.995}:Eu_{0.0050}$ | 27.6 | 19.4 | 19.4 | 2.0 | 31.0 | 0.6 | 644.2 | 69.6 | 0.652 | 0.347 | 101.3 |
| EXAMPLE 7 | $Ca_{0.998}AlSiO_{0.004}N_{2.998}:Eu_{0.0025}$ | 27.2 | 20.8 | 20.5 | 2.1 | 28.9 | 0.3 | 639.0 | 50.5 | 0.633 | 0.364 | 91.5 |

Study on Examples 1 to 7

The examples 1 to 7 were each conducted to measure the change in the optical properties in the phosphor when an increase and decrease of the oxygen concentration in the constitution of the production phase and an increase and decrease of the Eu; doping amount were performed together (namely, with the increase and decrease in the doping amount of $Eu_2O_3$ that is the raw material of the Eu element, the oxygen concentration in the constitution of the production phase also increases and decreases due to the oxygen supplied by the $Eu_2O_3$).

It has been found out that the emission maximum of the emission wavelength changes from the red in the vicinity of 660 nm shown by the example 1 to the orange-color tinged with red in the vicinity of 640 nm shown by the example 7, with the decrease in the oxygen concentration and the Eu doping concentration.

Here, the relationship between the emission maximum of the emission wavelength and the luminance in the phosphor according to each of the examples 1 to 7 will be explained with reference to FIG. 1.

FIG. 1 is a graph in which the luminance is plotted in the vertical axis while the emission wavelength is plotted in the horizontal axis, the relationships between the emission maximums of the emission wavelengths and the luminance of the phosphors according to the examples 1 to 7 are plotted, and the plotted points are connected by the solid line.

The following has been found out from the compositions of the phosphors according to the examples 1 to 7, and the plotted points connected by the solid line in FIG. 1.

Namely, the luminescence intensity decreases due to the decrease in the oxygen concentration in the production phase and the decrease in the doping concentration of Eu, but the luminance is enhanced. It has been found out that the luminance becomes the highest in the vicinity of 2.0 wt % of oxygen concentration and 0.0075 mol of the Eu doping concentration shown in the example 5 (This luminance was standardized as the relative intensity of 100%.), and when the concentration is further decreased, the luminescence intensity and the luminance both decrease this time, but the reduction in the luminance is so gentle that even with the 2.1 wt % of oxygen concentration and 0.0025 mol of Eu doping concentration shown in the example 7, the luminance of 90% or more is provided From the above, it has been found out that in the phosphors according to the examples 1 to 7, the emission wavelength can be optionally set in the range of the vicinity of 660 nm to the vicinity of 640 nm while the luminance was kept in the fixed range at a high level, by controlling the oxygen concentration and the Eu doping concentration at the time of preparation of the raw material.

Further, the oxygen which exists separately from the constitution of the production phase was 1.9 to 2.1 wt %.

Example 8

The commercially available $Ca_3N_2$(2N), CaO(3N), AlN (3N), $Si_3N_4$(3N) and $Eu_2O_3$(3N) were prepared. Except that the mixture ratio of the respective raw materials was set at (0.985–0.25)/3 mol of $Ca_3N_2$, 0.25 mol of CaO, 1 mol of AlN, 1/3 mol of $Si_3N_4$ and 0.015/2 mol of $Eu_2O_3$, the phosphor specimen according to the example 8 was produced similarly to the example 1, and the light emission properties were measured. The raw material composition formula, oxygen and nitrogen concentration, and the measurement result of the light emission properties of the phosphor specimen are shown in Table 2.

Example 9

Except that the mixture ratio of the respective raw materials was set at (0.985–0.50)/3 mol of $Ca_3N_2$, 0.50 mol of CaO, 1 mol of AlN, 1/3 mol of $Si_3N_4$ and 0.015/2 mol of $Eu_2O_3$, the phosphor specimen according to the example 9 was produced similarly to the example 8, and the light emission properties were measured similarly to the example 1. The raw material composition formula, oxygen and nitrogen concentration, and the measurement result of the light emission properties of the phosphor specimen are shown in Table 2.

Further, the excitation spectrum and the emission spectrum of the obtained phosphor specimen were measured, and the results are shown in FIG. 2 and FIG. 3 by being plotted by the two-dot chain line.

As is obvious from the measurement result in FIG. 2, it has been found out that the excitation spectrum of the phosphor specimen according to the example 9 existed in the wide range of 250 nm to 600 nm, and the light in the wide range from the ultraviolet to visible light can be utilized sufficiently and effectively.

As is obvious from the measurement result in FIG. 3, it has been found out that the emission spectrum of the phosphor specimen according to the example 9 has the peak value, which is lower than the examples 1 and 5, at 637.5 nm, but it has the half band width over the region with higher visual sensitivity than the examples 1 and 5.

Example 10

Except that the mixture ratio of the respective raw materials was set at (0.985–0.75)/3 mol of $Ca_3N_2$, 0.75 mol of CaO, 1 mol of AlN, 1/3 mol of $Si_3N_4$ and 0.015/2 mol of $Eu_2O_3$, the phosphor specimen according to the example 10 was produced similarly to the example 8, and the light emission properties were measured similarly to the example 1. The raw material composition formula, oxygen and nitrogen concentration, and the measurement result of the light emission properties of the phosphor specimen are shown in Table 2.

Example 11

Except that the mixture ratio of the respective raw materials was set at 0.985 mol of CaO, 1 mol of AlN, 1/3 mol of $Si_3N_4$ and 0.015/2 mol of $Eu_2O_3$, the phosphor specimen according to the example 11 was produced similarly to the example 8, and the light emission properties were measured similarly to the example 1. The raw material composition formula, oxygen and nitrogen concentration, and the measurement result of the light emission properties of the phosphor specimen are shown in Table 2.

The following has been found out from the compositions of the production phases according to the examples 8 to 11, and the plotted points connected by the dashed line in FIG. 1.

Namely, the luminescence intensity decreases due to the increase in the oxygen concentration in the composition of the production phase, but the luminance is enhanced. It has been found out that the luminance becomes the highest in the vicinity of 0.5 mol of oxygen doping concentration shown in the example 9, and when the concentration is further decreased, the luminescence intensity and the luminance both decrease this time, but the reduction in the luminance is so gentle that even with the oxygen doping concentration shown in the example 11, the luminance of 98% or more is provided.

From the above, it has been found out that in the phosphors according to the examples 8 to 11, the emission wavelength can be optionally set in the wide range of the vicinity of 660 nm to the vicinity of 610 nm while the luminance is kept in the fixed range at a high level, by controlling the oxygen concentration in the composition at the time of preparation of the raw material.

Further, 1.9 to 2.1 wt % of oxygen existed separately from the constitution of the production phase.

TABLE 2

|  | RAW MATERIAL PREPARATION COMPOSITION FORMULA | OXYGEN AND NITROGEN CONCENTRATION | | PEAK WAVE-LENGTH | LIGHT EMISSION INTENSITY | COLOR CHROMATICITY | | LUMI-NANCE |
| --- | --- | --- | --- | --- | --- | --- | --- | --- |
|  |  | O (wt %) | N (wt %) | (nm) | (%) | x | y | (%) |
| EXAMPLE 1 | $Ca_{0.985}AlSiO_{0.023}N_{2.985}$:$Eu_{0.0150}$ | 2.4 | 28.5 | 654.0 | 100.0 | 0.675 | 0.324 | 100.0 |
| EXAMPLE 8 | $Ca_{0.985}AlSiO_{0.273}N_{2.81}$:$Eu_{0.0150}$ | 5.2 | 25.1 | 646.1 | 69.7 | 0.649 | 0.350 | 102.6 |
| EXAMPLE 9 | $Ca_{0.985}AlSiO_{0.523}N_{2.652}$:$Eu_{0.0150}$ | 7.3 | 21.1 | 637.5 | 40.7 | 0.599 | 0.398 | 105.1 |
| EXAMPLE 10 | $Ca_{0.985}AlSiO_{0.773}N_{2.485}$:$Eu_{0.0150}$ | 9.0 | 21.0 | 624.5 | 30.8 | 0.571 | 0.426 | 102.0 |
| EXAMPLE 11 | $Ca_{0.985}AlSiO_{1.008}N_{2.328}$:$Eu_{0.0150}$ | 11.3 | 20.7 | 611.0 | 22.4 | 0.540 | 0.451 | 98.4 |

Study on Examples 8 to 11

The examples 8 to 11 were each conducted to measure the change in the optical properties of the phosphor when the oxygen concentration in the constitution of the production phase was increased and decreased. It should be noted that the Eu doping concentration was set at 0.015 mol.

It has been found out that the emission maximum of the emission wavelength changes from the red in the vicinity of 654 nm shown in the example 8 to the orange color in the vicinity of 610 nm shown in the example 11, with the increase in the oxygen concentration in the composition.

Here, the relationship between the emission maximum of the emission wavelength and the luminance in the phosphor according to each of the examples 8 to 11 will be explained with reference to FIG. 1.

FIG. 1 is the graph explained in the examples 1 to 7, and is the graph in which the relationships between the emission maximums of the emission wavelengths and the luminance of the phosphors according to the examples 8 to 11 are plotted, and the plotted points are connected by the dashed line.

Example 12

The commercially available $Ca_3N_2$(2N), CaO(3N), AlN (3N), $Si_3N_4$(3N) and $Eu_2O_3$(3N) were prepared. Except that the mixture ratio of the respective raw materials was set at (0.993–0.25)/3 mol of $Ca_3N_2$, 0.25 mol of CaO, 1. mol of AlN, 1/3 mol of $Si_3N_4$ and 0.075/2 mol of $Eu_2O_3$, the phosphor specimen according to the example 12 was produced similarly to the example 1, and the light emission properties were measured similarly to the example 1. The raw material composition formula, oxygen and nitrogen concentration, and the measurement result of the light emission properties of the phosphor specimen are shown in Table 3.

Example 13

Except that the mixture ratio of the respective raw materials was set at (0.993–0.50)/3 mol of $Ca_3N_2$, 0.50 mol of CaO, 1 mol of AlN, 1/3 mol of $Si_3N_4$ and 0.075/2 mol of $EU_2O_3$, the phosphor specimen according to the example 13 was produced similarly to the example 12, and the light emission properties were measured similarly to the example 1. The raw material composition formula, oxygen and nitrogen concentration, and the measurement result of the light emission properties of the phosphor specimen are shown in Table 3.

the measurement result of the emission maximums in the emission spectrums about the examples 1 to 13, and the measurement result of the color chromaticities x and y of the

TABLE 3

| RAW MATERIAL PREPARATION COMPOSITION FORMULA | OXYGEN AND NITROGEN CONCENTRATION | | PEAK WAVE-LENGTH | LIGHT EMISSION INTENSITY | COLOR CHROMATICITY | | LUMI-NANCE |
|---|---|---|---|---|---|---|---|
| | O (wt %) | N (wt %) | (nm) | (%) | x | y | (%) |
| EXAMPLE 5  $Ca_{0.993}AlSiO_{0.011}N_{2.993}:Eu_{0.0075}$ | 2.0 | 32.2 | 647.5 | 82.4 | 0.661 | 0.338 | 104.6 |
| EXAMPLE 12 $Ca_{0.993}AlSiO_{0.261}N_{2.826}:Eu_{0.0075}$ | 4.8 | 30.0 | 640.5 | 56.0 | 0.632 | 0.366 | 99.9 |
| EXAMPLE 13 $Ca_{0.993}AlSiO_{0.511}N_{2.659}:Eu_{0.0075}$ | 7.3 | 26.2 | 631.2 | 30.0 | 0.583 | 0.412 | 88.4 |

Study on Examples 5, 12 and 13

The examples 5, 12 to 13 were each conducted to measure the change in the optical properties of the phosphor when the oxygen concentration in the constitution of the production phase was increased and decreased. It should be noted that the Eu doping concentration was set at 0.0075 mol.

It has been found out that the emission maximum of the emission wavelength changes from the red in the vicinity of 647 nm shown in the example 5 to the orange-color tinged with red in the vicinity of 631 nm shown in the example 14, with the increase in the oxygen concentration in the composition.

Here, the relationship between the emission maximum of the emission wavelength and the luminance in the phosphor according to each of the examples 5, 12 and 13 will be explained with reference to FIG. 1.

FIG. 1 is the graph explained in the examples 1 to 7, and is the graph in which the relationships between the emission maximums of the emission wavelengths and the luminance in the phosphors according to the examples 12 and 13 are plotted, and the plotted points are connected by the two-dot chain line.

The following has found out from the compositions of the production phases according to the examples, 5, 12 and 13, and the plotted points connected by the two-dot chain line in FIG. 1.

Namely, the luminescence intensity decreases due to the increase in the oxygen concentration in the composition, and the luminance gradually decreases.

From the above, it has been found out that each of the phosphors according to the examples 5, 12 and 13 is the phosphor of which control width is narrow as compared with the phosphors according to the examples 8 to 11 since its luminescence intensity and luminance decrease by the increase in the oxygen concentration in the composition, but the emission wavelength can be set at the red in the vicinity of 647 nm to the orange-color tinged with red in the vicinity of 631 nm by the increase and decrease in the oxygen concentration in the composition, while the luminance is kept in the fixed range at a high level.

Further, 1.6 to 1.8 wt % of oxygen existed separately from the constitution of the production phase.

Study on the examples 1 to 13

As the result of the concentration analysis of each element about the examples 1 to 7, the result of the concentration analyses of oxygen and nitrogen about the examples 8 to 13, light emission, it has been found out that when the phosphors according to the examples include 24 to 30 wt % of Ca, 17 to 21 wt % of Al, 18 to 22 wt % of Si, 1 to 15 wt % of oxygen, 15 to 33 wt % of nitrogen, and 0.01 to 10 wt % of Eu, the emission maximums in the emission spectrum are in the range of 600 nm to 660 nm, and the color chromaticity x of the light emission is in the preferable range of 0.5 to 0.7 and the color chromaticity y of the light emission is in the preferable range of 0.3 to 0.5.

Example 14

Figure 4:
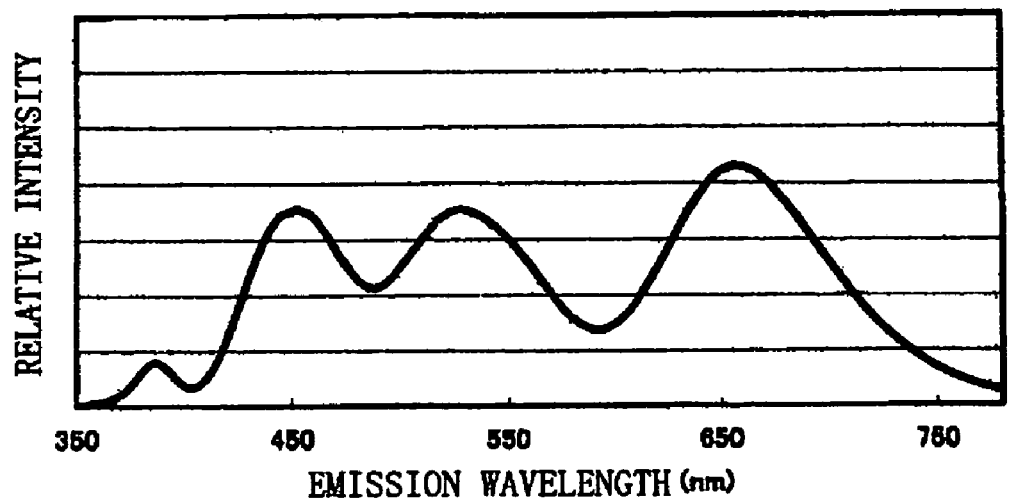
FIG. 4 is a graph showing an emission spectrum of an LED according to an example of the present invention.

The while LED was produced by joining the mixture at the predetermined ratio of the phosphor specimen obtained in the example 1, BAM:Eu that is the commercially available blue phosphor, and ZnS:Cu,Al that are the commercially available green phosphors to be able to obtain daylight corresponding to the color temperature of 6500 K onto the LED (emission wavelength of 385.2 nm) of ultraviolet light having the nitride semiconductor as the light emitting portion, and the ultraviolet light was emitted. The predetermined ratio was obtained by preparing the mixture specimen of each phosphor in accordance with the compounding ratio obtained by carrying out simulation of combination of the emission spectrum waveform of each phosphor, then making the mixture specimen emit light and adjusting the mixture ratio. The result of measuring the emission spectrum of the obtained white LED is shown in FIG. 4. Each of the phosphors emitted light by the light from the light emitting portion of the ultraviolet light, and the white LED emitting the white light corresponding to the color temperature of 6580 K was obtained. The average color rendering coefficient (Ra) of the obtained LED was 81, which was excellent. Further, by properly changing the compounding amount of the phosphors, the light emission colors of various color tones with excellent color rendering properties were able to be obtained.

Example 15

Figure 5:
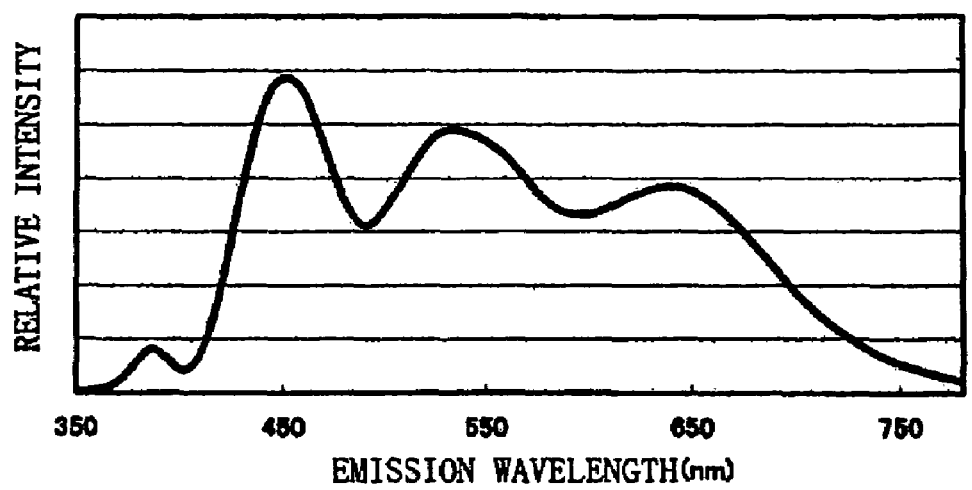
FIG. 5 is a graph showing the emission spectrum of an LED according to a different example of the present invention.

By using four kinds of phosphors, which were phosphor specimens obtained in the example 1 and the example 8, BAM:Eu that is the commercially available blue phosphor, and ZnS:Cu,Al that are the commercially available green phosphors, the white LED was produced by combining the mixture of the respective phosphors at the predetermined ratio with the same method as the example 14 to obtain the daylight corresponding to the color temperature of 6500 K, with the light emitting portion of ultraviolet light with the known method. The result of measuring the emission spectrum of the obtained LED is shown in FIG. 5. Each of the phosphors emitted light by the ultraviolet light from the light emitting portion of the ultraviolet light, and the white LED emitting the white light corresponding to the color temperature of 6615 K was obtained. The average color rendering coefficient (Ra) of the obtained white LED was 93, which was very excellent. Comparing FIG. 5 and FIG. 4, it has been found out that the white LED according to the example 15 is supplied with the light in the vicinity of 600 nm in the emission spectrum of the white LED according to the example 14, and the light emission color more excellent in the color rendering properties with high luminance is obtained.

In the phosphor according to the first to eleventh constitutions, the emission maximum of the light emission can be optionally set in the region with high human visual sensitivity by controlling the oxygen content and/or a doping amount of the activator in the constitution of the main production phase, and the phosphor emits light of red color having color rendering properties and luminance properties, and has the excitation band from ultraviolet to visible light (wavelength region of 250 nm to 600 nm).

According to the twelfth constitution, as the raw material of at least one element selected from the aforementioned element M, element A and element B, the compound having this element and oxygen, and the compound having this element and nitrogen are prepared, and by controlling the compounding ratio of both of the compound having this element and oxygen and the compound having this element and nitrogen, an oxygen amount and a nitrogen amount in the main production phase of the phosphor can be controlled without changing the value of m.

According to the method of shifting the emission wavelength of the phosphor according to the thirteenth to fifteenth constitutions, as the raw material of at least one element selected from the aforementioned element M, element A and element B, the compound having this element and oxygen and the compound having this element and nitrogen are prepared, and by controlling the oxygen concentration included in the main production phase of the aforementioned phosphor by compounding of the compound having this element and oxygen and the compound having this element and nitrogen, and/or by controlling the compounding amount of the element Z, the emission wavelength can be optionally set while the luminance of the phosphor is kept.

The light source according to the sixteenth to seventeenth constitutions is the light source which performs light emission with high luminance and favorable color lending properties, and has high emission efficiency.

The LED according to the eighteenth to nineteenth constitutions is the LED which performs light emission with high luminance and favorable color rendering properties, and has high emission efficiency.

What is claimed is:

1. A phosphor comprising a main production phase of a phosphor expressed by a composition formula of MmAaBbOoNn:Zz (where an element M is one or more bivalent elements, an element A is one or more trivalent elements, an element B is one or more tetravalent elements, O is oxygen, N is nitrogen, an element Z is an activator, n=2/3m+a+4/3b−2/3o, wherein m=a=b=1 and o and n is not 0).

2. The phosphor according to claim 1, wherein $0<o \leqq m$, and $0.0001 \leqq z/(m+z) \leqq 0.5$.

3. The phosphor according to claim 1, wherein the element M is one or more elements selected from Mg (magnesium), Ca (calcium), Sr (strontium), Ba (barium) and Zn (zinc), the element A is one or more elements selected from B (boron), Al (aluminum) and Ga (gallium), the element B is Si (silicon) and/or Ge (germanium), and the element Z is one or more elements selected from rare earth or transition metals.

4. The phosphor according to claim 1, wherein the element A is Al (aluminum), and the element B is Si (silicon).

5. The phosphor according to claim 1, wherein the element Z is at least one or more elements selected from Eu (europium), Mn (manganese), Sm (samarium) and Ce (cerium).

6. The phosphor according to claim 1, wherein the element Z is Eu (europium).

7. The phosphor according to claim 1, wherein said phosphor is in a powder form.

8. The phosphor according to claim 7, wherein an average particle size of the phosphor in the powder form is from 0.1 μm to 20 μm inclusive.

9. A phosphor comprising the main production phase of the phosphor expressed by the composition formula of MmAaBbOoNn:Zz (where an element M is one or more bivalent elements, an element A is one or more trivalent elements, an element B is one or more tetravalent elements, O is oxygen, N is nitrogen, an element Z is an activator, n=2/3m+a+4/3b−2/3o, m/(a+b)≧1/2,(o+n)/(a+b)>4/3, and none of m, a, b, o, n is equal to 0), said phosphor including said oxygen by 3 wt % or less with respect to a mass of the main production phase of the phosphor.

10. The phosphor according to claim 9, satisfying m=a=b=1.

11. The phosphor according to claim 9, satisfying $0<o \leqq m$, and $0.0001 \leqq z/(m+z) \leqq 0.5$.

12. The phosphor according to claim 9, wherein the element M is one or more elements selected form Mg (magnesium), Ca (calcium), Sr (strontium), Ba (barium), and Zn (zinc), the element A is one or more elements selected from B (boron), Al (aluminum) and Ga (gallium), the element B is Si (silicon) and/or Ge (germanium), and the element Z is one or more elements selected from rare earth and transition metals.

13. The phosphor according to claim 9, wherein the element A is Al (aluminum), and the element B is Si (silicon).

14. The phosphor according to claim 9, wherein the element Z is at least one or more elements selected from Eu (europium), Mn (manganese), Sm (samarium), and Ce (cerium).

15. The phosphor according to claim 9, wherein the element Z is Eu (europium).

16. A phosphor comprising 24 wt % to 30 wt % of Ca (calcium), 17 wt % to 21 wt % of Al (aluminum), 18 wt % to 22 wt % of Si (silicon), 1 wt % to 15 wt % of oxygen, 15 wt % to 33 wt % of nitrogen and 0.01 wt % to 10 wt % of Eu (europium), wherein an emission maximum in an emission spectrum is in a range of 600 nm to 660 nm; and wherein color chromaticity x of light emission is in a range of 0.5 to 0.7, and color chromaticity y of the light emission is in a range of 0.3 to 0.5.

17. A manufacturing method of the phosphor according to claim 1, comprising:

as a raw material of at least one element selected from the element M, element A and element B, preparing a compound having the element and oxygen, and a compound having the element and nitrogen;

mixing the compound thus prepared and baking a mixture thereof; and controlling an oxygen concentration included in the main production phase of said phosphor by compounding of the compound having the element and oxygen and the compound having the element and nitrogen.

18. A method of shifting an emission wavelength of the phosphor according to claim 1, comprising:

in a manufacturing step of mixing raw materials and baking a mixture thereof, as a raw material of at least one element selected from the element M, element A and element B, preparing a compound having the element and oxygen, and a compound having the element and nitrogen; and controlling an oxygen concentration included in the main production phase of said phosphor by compounding of the compound having the element and oxygen and the compound having the element and nitrogen, and thereby shifting the emission wavelength.

19. A method of shifting an emission wavelength of the phosphor according to claim 1, comprising:

in a manufacturing step of mixing raw materials and baking a mixture thereof, controlling a compounding amount of the element Z, and thereby shifting the emission wavelength.

20. A method of shifting an emission wavelength of the phosphor according to claim 1, comprising:

in a manufacturing step of mixing raw materials and baking a mixture thereof, as a raw material of at least one element selected from the element M, element A and element B, preparing a compound having the element and oxygen, and a compound having the element and nitrogen;

controlling an oxygen concentration included in the main production phase of the phosphor by compounding of the compound having the element and oxygen and the compound having the element and nitrogen, and thereby shifting the emission wavelength; and controlling a compounding amount of the element Z, and thereby sifting the emission wavelength.

21. A light source comprising the phosphor according to claim 1, and a light emitting portion emitting light of a predetermined wavelength, wherein a part of the light of the predetermined wavelength is set to be an excitation source, and said phosphor is made to emit light of a different wavelength from the predetermined wavelength.

22. The light source according to claim 21, the predetermined wavelength is a wavelength of any one of 250 nm to 600 nm.

23. An LED comprising the phosphor according to claim 1, and a light emitting portion emitting light of a predetennined wavelength, wherein a part of the light of the predetermined wavelength is set to be an excitation source, and said phosphor is made to emit light of a different wavelength from the predetermined wavelength.

24. The LED according to claim 23, wherein the predetermined wavelength is a wavelength of any one of 250 nm to 600 nm.

25. A manufacturing method of the phosphor according to claim 7, comprising:

as a raw material of at least one element selected from the element M, element A and element B, preparing a compound having the element and oxygen, and a compound having the element and nitrogen;

mixing the compound thus prepared and baking a mixture thereof; and controlling an oxygen concentration included in the main production phase of said phosphor by compounding of the compound having the element and oxygen and the compound having the element and nitrogen.

26. A method of shifting an emission wavelength of the phosphor according to claim 7, comprising:

in a manufacturing step of mixing raw materials and baking a mixture thereof, as a raw material of at least one element selected from the element M, element A and element B, preparing a compound having the element and oxygen, and a compound having the element and nitrogen; and controlling an oxygen concentration included in the main production phase of said phosphor by compounding of the compound having the element and oxygen and the compound having the element and nitrogen, and thereby shifting the emission wavelength.

27. A method of shifting an emission wavelength of the phosphor according to claim 7, comprising:

in a manufacturing step of mixing raw materials and baking a mixture thereof controlling a compounding amount of the element Z, and thereby shifting the emission wavelength.

28. A method of shifting an emission wavelength of the phosphor according to claim 7, comprising:

in a manufacturing step of mixing raw materials and baking a mixture thereof as a raw material of at least one element selected from the element M, element A and element B, preparing a compound having the element and oxygen, and a compound having the element and nitrogen; and controlling an oxygen concentration included in the main production phase of said phosphor by compounding of the compound having the element and oxygen and the compound having the element and nitrogen, and thereby shifting the emission wavelength, and controlling a compounding amount of the element Z, and thereby shifting the emission wavelength.

29. A light source, comprising the phosphor according to claim 7, and a light emitting portion emitting light of a predetermined wavelength, wherein a part of the light of the predetermined wavelength is set to be an excitation source, and said phosphor is made to emit light of a different wavelength from the predetermined wavelength.

30. The light source according to claim 29, wherein the predetermined wavelength is a wavelength of any one of 250 nm to 600 nm.

31. An LED comprising the phosphor according to claim 7, and a light emitting portion emitting light of a predetermined wavelength, wherein a part of the light of the predetermined wavelength is set to be an excitation source, and said phosphor is made to emit light of a different wavelength from the predetermined wavelength.

32. The LED according to claim 31, wherein the predetermined wavelength is a wavelength of any one of 250 nm to 600 nm.

* * * * *